(12) United States Patent
Tanaka et al.

(10) Patent No.: US 7,654,543 B2
(45) Date of Patent: Feb. 2, 2010

(54) VEHICLE SUSPENSION ARM SUPPORTING STRUCTURE

(75) Inventors: Masatoshi Tanaka, Osaka (JP); Yasushi Yoshida, Osaka (JP)

(73) Assignee: Daihatsu Motor Co., Ltd., Osaka (JP)

( * ) Notice: Subject to any disclaimer, the term of this patent is extended or adjusted under 35 U.S.C. 154(b) by 202 days.

(21) Appl. No.: 11/660,527

(22) PCT Filed: Sep. 8, 2005

(86) PCT No.: PCT/JP2005/016998

§ 371 (c)(1),
(2), (4) Date: Feb. 16, 2007

(87) PCT Pub. No.: WO2006/030843

PCT Pub. Date: Mar. 23, 2006

(65) Prior Publication Data

US 2007/0278778 A1     Dec. 6, 2007

(30) Foreign Application Priority Data

Sep. 14, 2004     (JP) .............................. 2004-266252

(51) Int. Cl.
*B62D 21/11*     (2006.01)

(52) U.S. Cl. ............................... 280/124.109; 280/788; 180/312

(58) Field of Classification Search ................ 180/311, 180/312; 280/124.109, 124.134, 781, 784, 280/785, 788
See application file for complete search history.

(56) References Cited

U.S. PATENT DOCUMENTS

| 2,311,603 | A | * | 2/1943 | Ulrich | 280/788 |
| 4,531,761 | A | * | 7/1985 | von Sivers | 280/785 |
| 4,723,791 | A | * | 2/1988 | Miura et al. | 280/124.109 |
| 4,762,336 | A | * | 8/1988 | Ogawa et al. | 280/124.15 |
| 5,547,224 | A | * | 8/1996 | Kami et al. | 280/834 |
| 5,562,308 | A | * | 10/1996 | Kamei et al. | 280/788 |
| 5,611,569 | A | * | 3/1997 | Sekiguchi et al. | 280/788 |

(Continued)

FOREIGN PATENT DOCUMENTS

CN     1195649 C     4/2005

(Continued)

*Primary Examiner*—Paul N Dickson
*Assistant Examiner*—Laura Freedman
(74) *Attorney, Agent, or Firm*—Harness, Dickey & Pierce, P.L.C.

(57) ABSTRACT

The invention relates to a vehicle suspension arm supporting structure. A receiving portion 9 is formed integrally on a subframe 5 which is formed of a light metal in such a manner as to extend transversely outwards, and a sheet steel member 15 is connected to the subframe 5 by a bolt or a nut in such a manner as to be situated below the receiving portion 9 of the subframe 5 at a predetermined interval. A base portion 13b of a suspension arm 13 is disposed between the receiving portion 9 of the subframe 5 and the sheet steel member 15, the base portion 13b of the suspension arm 13 is supported on the subframe 5 via a rubber bushing joint 14 by a connecting bolt 16 which vertically passes through the receiving portion 9 of the subframe 5 and the sheet steel member 15, and the receiving portion 9 of the subframe 5 is connected to a side member 4 by the connecting bolt 16.

5 Claims, 4 Drawing Sheets

U.S. PATENT DOCUMENTS

| | | | |
|---|---|---|---|
| 5,862,877 A * | 1/1999 | Horton et al. | 180/312 |
| 5,879,026 A * | 3/1999 | Dostert et al. | 280/781 |
| 5,938,220 A * | 8/1999 | Torneld | 280/124.145 |
| 6,085,856 A * | 7/2000 | Law et al. | 180/291 |
| 6,375,221 B1 * | 4/2002 | Kudou | 280/788 |
| 6,679,523 B2 | 1/2004 | Yamamoto et al. | |
| 6,869,090 B2 | 3/2005 | Tatsumi et al. | |
| 2002/0033594 A1 | 3/2002 | Yamamoto et al. | |
| 2002/0140220 A1 | 10/2002 | Tatsumi et al. | |
| 2004/0046381 A1 * | 3/2004 | Yoshida et al. | 280/784 |

FOREIGN PATENT DOCUMENTS

| | | |
|---|---|---|
| DE | 32 17 959 A1 | 11/1983 |
| DE | 3441560 A1 | 5/1986 |
| DE | 199 47 759 C2 | 11/2001 |
| EP | 1188643 A1 | 3/2002 |
| EP | 1245477 A2 | 10/2002 |
| EP | 1266773 A2 | 12/2002 |
| JP | 58078809 A * | 5/1983 |
| JP | 04092770 A * | 3/1992 |
| JP | 04215565 A * | 8/1992 |
| JP | 08156829 A * | 6/1996 |
| JP | 2000-071733 A | 3/2000 |
| JP | 2002087319 A | 3/2002 |
| JP | 2002200988 A | 7/2002 |
| JP | 2002284031 A | 10/2002 |
| JP | 2002-370670 A | 12/2002 |
| JP | 2002347650 A | 12/2002 |
| JP | 2003-118630 A | 4/2003 |

* cited by examiner

VEHICLE SUSPENSION ARM SUPPORTING STRUCTURE

TECHNICAL FIELD

The present invention relates to a suspension arm supporting structure in passenger vehicles and commercial vehicles.

BACKGROUND ART

As is disclosed in, for example, Patent Document No. 1, in a vehicle, there is a configuration in which right and left side members (FR, FL in FIGS. 1 and 2 of Patent Document No. 1) are disposed in a longitudinal direction at a front lower part of a vehicle body, and a subframe (FS in FIGS. 1 and 2 of Patent Document No. 1) is connected to the right and left side members in such a manner as to extend therebetween, so that suspension arms (11 in FIGS. 1 and 2 of Patent Document No. 1) for supporting front wheels are supported on the subframe.

In Patent Document No. 1, at one supporting portion of a plurality of supporting portions of the subframe which support the suspension arm, an upper receiving portion (21, 22, 22a in FIGS. 2 and 5 of Patent Document No. 1) is provided on the subframe in such a manner as to extend transversely outwards, and a lower receiving portion (33 in FIGS. 2 and 5 of Patent Document No. 1) is provided on the subframe at a predetermined downward interval from the upper receiving portion on the subframe in such a manner as to extend transversely outwards. By this configuration, a suspension arm is made to be supported on the subframe via a rubber bushing joint (13 in FIGS. 2 and 5 of Patent Document No. 1) by a connecting bolt (34 in FIGS. 2 and 5 of Patent Document No. 1) which passes vertically through the upper and lower receiving portions of the subframe.

Patent Document No. 1: JP-A-2002-370670

In recent years, to reduce the weight of the subframe, it is considered that a subframe is formed of a light metal. When a subframe is formed of a light metal like this, in the event that a configuration as is described in Patent Document No. 1 is adopted in which an upper receiving portion (21, 22, 22a in FIGS. 2 and 5 of Patent Document No. 1) is provided on the subframe in such a manner as to extend transversely outwards, and a lower receiving portion (33 in FIGS. 2 and 5 of Patent Document No. 1) is provided on the subframe at a predetermined downward interval from the upper receiving portion on the subframe in such a manner as to extend transversely outwards, the space defined between the upper and lower receiving portions of the subframe needs to match a vertical length of a rubber bushing joint (a base portion of a suspension arm) with good accuracy.

To describe this in other words, after the subframe is formed of, for example, a light metal, in the event that the space defined between the upper and lower receiving portions of the subframe is larger than the vertical length of the rubber bushing joint (the base portion of the suspension arm), a force is produced which attempts to bend the lower receiving portion of the subframe upwards by tightening a connecting bolt, leading to a risk that a crack is produced in the vicinity of the lower receiving portion of the subframe. Consequently, after the subframe is formed of the light metal, machining needs to be applied to the upper and lower receiving portions of the subframe so that the space defined between the upper and lower receiving portions of the subframe matches the vertical length of the rubber bushing joint (the base portion of the suspension arm) with good accuracy.

Furthermore, in a case where a subframe is formed through die-casting, when attempting to have a configuration as is described in Patent Document No. 1 in which an upper receiving portion is provided on the subframe in such a manner as to extend transversely outwards, and a lower receiving portion is provided on the subframe at a predetermined downward interval from the upper receiving portion on the subframe in such a manner as to extend transversely outwards, the upper and lower receiving portions cannot be integrally formed on the subframe through die-casing unless a slide mold is used.

DISCLOSURE OF THE INVENTION

An object of the invention is to provide a vehicle suspension arm supporting structure in which suspension arms are made to be supported on a subframe without any difficulty and with good accuracy while realizing a reduction in weight by forming the subframe of a light metal.

(Configuration)

A first feature of the invention resides in the following configuration in a vehicle suspension arm supporting structure.

Right and left side members which are disposed longitudinally at a lower part of a vehicle body and a subframe which is made of a light metal and is connected to the right and left side members in such a manner as to extend therebetween are provided, and suspension arms which support wheels are made to be supported on the subframe. At one supporting portion of a plurality of supporting portions of the subframe which support the suspension arm, a receiving portion is integrally formed on the subframe in such a manner as to extend transversely outwards, and a sheet steel member is connected to the subframe by a bolt or a nut in such a manner as to be situated below the receiving portion of the subframe at a predetermined interval. A base portion of the suspension arm is disposed between the receiving portion of the subframe and the sheet steel member, the base portion of the suspension arm is made to be supported on the subframe via a rubber bushing joint by a connecting bolt which passes vertically through the receiving portion of the subframe and the sheet steel member, and the receiving portions of the subframe are connected to the right and left side members by the connecting bolts.

(Function)

[I]

According to the first feature of the invention, in the event that the subframe is formed of the light metal, and the receiving portion is formed integrally on the subframe in such a manner as to extend transversely outwards, as a member which corresponds to a lower receiving portion of the subframe, the sheet steel member, which is a separate member from the subframe, is used.

By this configuration, according to the first feature of the invention, even though the space between the receiving portion of the subframe and the sheet steel member does not match a vertical length of the rubber bushing joint with good accuracy (for example, even though the space between the receiving portion of the subframe and the sheet steel member is slightly larger than the vertical length of the rubber bushing joint (the base portion of the suspension arm), a difference between the space between the receiving portion of the subframe and the sheet steel member and the vertical length of the rubber bushing joint (the base portion of the suspension arm) is absorbed by the sheet steel member by virtue of an elastic deflection of the sheet steel member by the connecting bolt (or a nut) being tightened.

As with the first feature of the invention, when the difference between the space between the receiving portion of the subframe and the sheet steel member and the vertical length of the rubber bushing joint (the base portion of the suspension arm) is absorbed by the sheet steel member, the application of machining to the receiving portion of the subframe is made unnecessary, and a force is not produced which attempts to bend the receiving portion of the subframe, whereby no risk is produced that a crack is produced in the vicinity of the receiving portion of the subframe.

According to the first feature of the invention, even though an assembling error is produced in the position of the rubber bushing joint (the base portion of the suspension arm) when the sheet steel member is mounted, the assembling error in the position of the rubber bushing joint (the base portion of the suspension arm) can be absorbed by the sheet steel member by finely adjusting the mounting position when the sheet steel member is mounted on the subframe.

According to the first feature of the invention, in the event that the subframe is formed of the light metal and the receiving portion is formed integrally on the subframe in such a manner as to extend transversely outwards, since the sheet steel member, which is the separate member from the subframe, is used and upper and lower receiving portions as are provided in Patent Document No. 1 are not provided, when the subframe is formed through die-casting, the subframe and the receiving portion of the subframe can be formed integrally through die-casting without using the slide mold.

[II]

As is described in Patent Document No. 1, with the upper and lower receiving portions (21, 22, 22a, 33 in FIGS. 2 and 5 of Patent Document No. 1) caused to extend transversely outwards from the subframe, when the suspension arm is removed from the subframe for maintenance or the like, after the connecting bolt (34 in FIGS. 2 and 5 of Patent Document No. 1) is drawn downwards, the suspension arm is pulled transversely outwards from the upper and lower receiving portions of the subframe, whereby the suspension arm is removed.

In the real world, however, since a wheel well and other members are disposed on the periphery of the suspension arm, it becomes difficult to draw the suspension arm transversely outwards from the upper and lower receiving portions of the subframe. Consequently, after the subframe is removed from the right and left side members, so that the subframe is moved downwards, the connecting bolt is drawn downwards to be dislocated, so that the suspension arm is dislocated transversely outwards from the upper and lower receiving portions of the subframe so as to be removed.

In contrast to this, according to the first feature of the invention, when the suspension arm is removed from the subframe for maintenance or the like, after the connecting rod is dislocated downwards or the nut is removed from the connecting bolt, the sheet steel member is removed from the subframe, when an area lying below the base portion of the suspension arm which is situated at the receiving portion of the subframe is released to be open, whereby the base portion of the suspension arm is drawn downwards so that the suspension arm can be removed, thereby making it possible to dislocated the suspension arm from the subframe downwards so as to be removed without being interrupted by the wheel well and the other members.

Thus, in case the suspension arm can be dislocated downwards from the subframe for removal therefrom without being interrupted by the wheel well and the other members in this way, when the suspension arm is removed from the subframe, the necessity of removing the subframe from the right and left side members is obviated.

[III]

In contrast to the case where the suspension arm is removed from the subframe for maintenance or the like as is described in the previous section [II], when vehicles are produced, in many cases, a subframe and suspension arms are generally mounted on right and left side members as a unit in such a state that the suspension arms and other members are mounted on the subframe. In a production process like this, in the first feature of the invention, the suspension arms and the sheet steel member only have to be mounted on the subframe in advance.

In contrast to the production process that has been described above, there is a production process in which a subframe is firstly mounted on right and left side members without mounting suspension arms on the subframe in advance, and thereafter, the suspension arms are mounted on the subframe.

In a production process like this, according to the first feature of the invention, firstly, the subframe is mounted on the right and left side members. In this case, since the areas lying below the vicinities of the receiving portions of the subframe are left open, the suspension arms are moved upwards so that the base portions of the suspension arms can be positioned at the receiving portions of the subframe, and thereafter, the sheet steel members are mounted on the subframe, the connecting bolts are passed vertically through between the receiving portions of the subframe and the sheet steel members, so that the base portions of the suspension arm are supported on the subframe via the rubber bushing joints, and the receiving portions of the subframe are connected to the right and left side members.

As has been described above, according to the first feature of the invention, it becomes possible to deal with the two production processes such as the production process in which the subframe and the suspension arms are mounted on the right and left side members as the single unit and the production process in which the subframe is firstly mounted on the right and left side members, and thereafter, the suspension arms are mounted on the subframe.

[IV]

According to the first feature of the invention, the base portions (the rubber bushing joints) of the suspension arms are situated on the lower sides of the receiving portions of the subframe, and the sheet steel members are situated on the lower sides of the base portions (the rubber bushing joints) of the suspension arms.

By this configuration, since there is a high possibility that the sheet steel members are brought into contact with an obstacle (for example, a curb of a pavement) on the ground or a stone caused to spring from the ground, so that the possibility is reduced that the base portions (the rubber bushing joints) of the suspension arms are brought into contact with the obstacle on the ground or the like, the damage of the receiving portions (the light metal portions) of the subframe and the base portions (the rubber bushing joints) of the suspension arms can be reduced. In this case, since the sheet steel members can easily be removed from the subframe as has been described in the section [II] above, even though the sheet steel members are brought into contact with the obstacle on the ground or the like to be damaged, the sheet steel members only have to be replaced.

ADVANTAGES OF THE INVENTION

According to the first feature of the invention, in the vehicle suspension arm supporting structure, the mounting accuracy of the suspension arm has been able to be increased by the two points that the difference between the space between the receiving portion of the subframe and the sheet steel member and the vertical length of the rubber bushing joint (the base portion of the suspension arm) is absorbed by the sheet steel member by virtue of the elastic deflection of the sheet steel member by the connecting bolt (or the nut) being tightened and that the assembling error in the position of the rubber bushing joint (the base portion of the suspension arm) can be absorbed by the sheet steel member by finely adjusting the mounting position when the sheet steel member is mounted on the subframe.

According to the first feature of the invention, the durability and maintainability of the receiving portions of the subframe and the base portions (the rubber bushing joints) of the suspension arms have been able to be increased by a point that no machining needs to be applied to the receiving portions of the subframe and a point that no force which attempts to bend the receiving portions of the subframe is produced and hence, no crack is produced in any case in the vicinities of the receiving portions of the subframe.

In addition, when the subframe is formed through, for example, die-casting, the subframe and the receiving portions of the subframe can be formed integrally through die-casting without using the slide mold, thereby making it possible to realize the reduction in production costs of the subframe.

According to the first feature of the invention, the workability has been able to be increased by a point that the suspension arms can be removed from the subframe without removing the subframe from the right and left side members and a point that even though the sheet steel members are brought into contact with the obstacle on the ground or the like to be damaged, the sheet steel members can easily be replaced.

According to the first feature of the invention, with respect to the subframe and the suspension arms, the two production processes have been able to be dealt with, so that the accommodation corresponding to the production processes has been able to be increased.

(Configuration)

A second feature of the invention resides in the following configuration in the vehicle suspension arm supporting structure of the first feature of the invention.

The sheet steel member is set at a portion closest to the ground of the plurality of supporting portions of the subframe which support the suspension arm.

(Function)

According to the second feature of the invention, the sheet steel member is set at the portion closest to the ground of the plurality of supporting portions of the subframe which support the suspension arm. Furthermore, as is described in the previous section [IV], the base portion (the rubber bushing joint) of the suspension arms are situated on the lower sides of the receiving portions of the subframe, and the sheet steel members are situated on the lower sides of the base portion (the rubber bushing joints) of the suspension arms.

By this configuration, the damage of the receiving portions (the light metal portions) of the subframe and the base portions (the rubber bushing joints) of the suspension arms can be reduced more effectively. In addition, as is described in the previous section [II], since the sheet steel members can easily be removed from the subframe, even though the sheet steel members are brought into contact with the obstacle on the ground or the like to thereby be damaged as has been described above, the sheet steel members only have to be replaced.

ADVANTAGE OF THE INVENTION

According to the second feature of the invention, similar "advantages of the invention" to those of the first feature of the invention are provided, and in particular, the damage of the receiving portions (the light metal portions) of the subframe and the base portions (the rubber bushing joints) of the suspension arms can be reduced more effectively.

(Configuration)

A third feature of the invention resides in the following configuration in the vehicle suspension arm supporting structure of the first feature of the invention.

The sheet steel member is caused to extend from the subframe, and an extending portion of the sheet steel member is connected to a stationary portion of a vehicle.

(Function)

According to the third feature of the invention, a similar "function" to that of the first feature of the invention is provided, and in addition to this, the following "function" will be provided.

According to the third feature of the invention, since the subframe is connected to the stationary portion of the vehicle also by the sheet steel members of the subframe, the subframe is allowed to be supported strongly and rigidly.

ADVANTAGE OF THE INVENTION

According to the third feature of the invention, similar "advantages of the invention" to those of the first feature of the invention are provided, and in addition to this, the following "advantage of the invention" will be provided.

According to the third feature of the invention, the subframe is allowed to be supported strongly and rigidly, thereby making it possible to increase the supporting strength of the subframe.

(Configuration)

A fourth feature of the invention resides in the following configuration in the vehicle suspension arm supporting structure of the third feature of the invention.

The right and left side members and the subframe are disposed at a front lower part of the vehicle body, and the one supporting portion of the plurality of supporting portions of the subframe which support the suspension arm is situated at a rear portion of the subframe. The sheet steel members are caused to extend rearwards from the subframe, and extending portions of the sheet steel members are connected to the right and left side members.

(Function)

According to the fourth feature of the invention, similar "functions" to those of the first to third features of the invention are provided, and in addition to them, the following "function" will be provided.

In general, in the vehicle, at the time of a frontal collision, the right and left side members are configured so as to be broken to thereby absorb the impact energy.

As this occurs, according to the fourth feature of the invention, the right and left side members are broken at the time of a frontal collision to thereby absorb the impact energy, and in conjunction with this, when the connection between the right and left side members and the subframe is broken, the subframe is pushed rearwards by the impact energy, whereby in conjunction with this, the sheet steel members are broken (in particular, the extending portions of the sheet steel members which are caused to extend rearwards from the subframe are bent) to thereby absorb the impact energy.

ADVANTAGE OF THE INVENTION

According to the fourth aspect of the invention, similar "advantages of the invention" to those of the first to third features of the invention are provided, and in addition to them, the following "advantage of the invention" will be provided.

According to the fourth feature of the invention, in addition to the right and left side members, the sheet steel members are also allowed to absorb the impact energy at the time of a frontal collision of the vehicle body, whereby the impact energy absorbing function of the vehicle has been able to be increased.

BEST MODE FOR CARRYING OUT THE INVENTION

Figure 1:
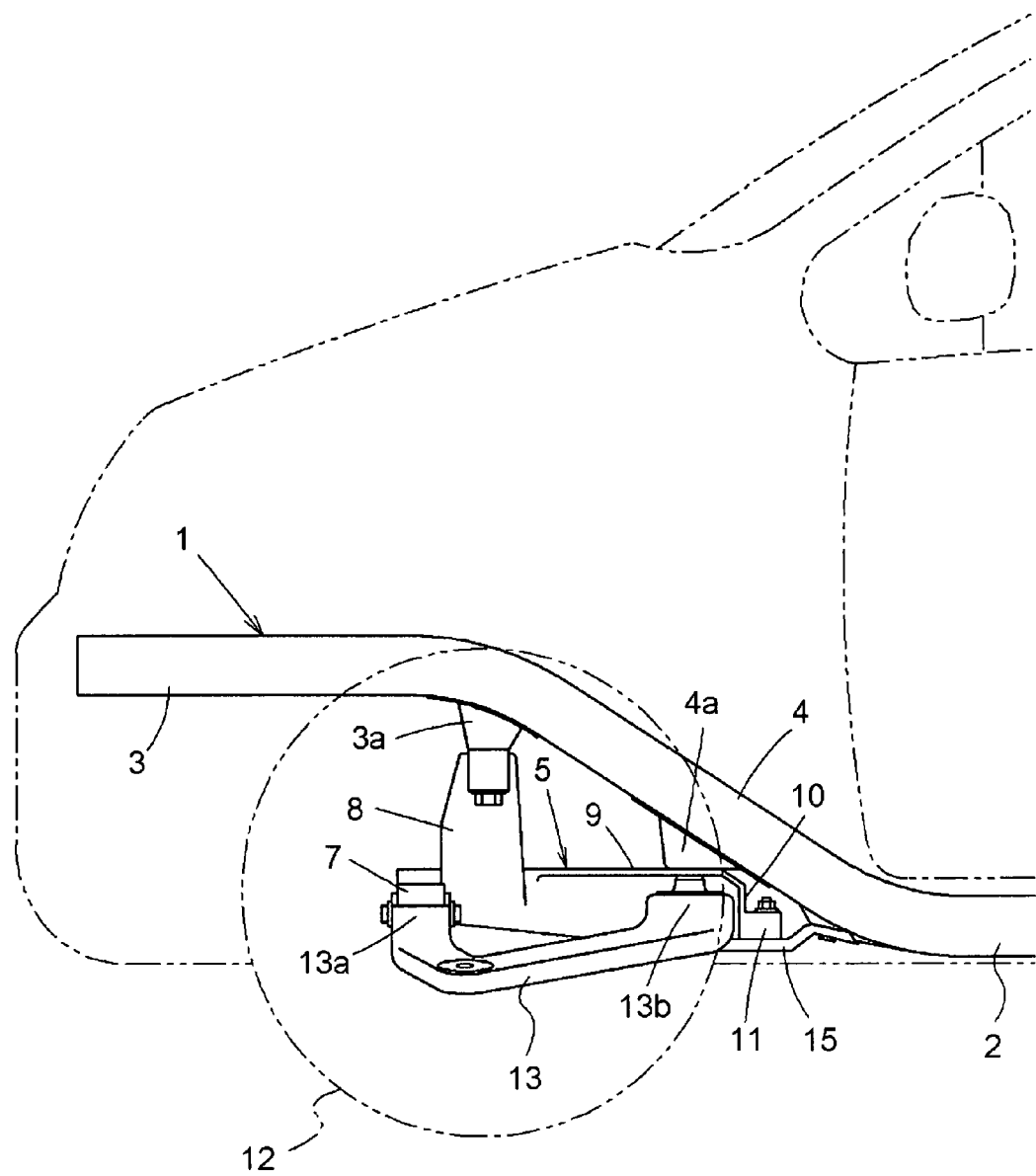
FIG. 1 is a side view of the vicinity of a front lower part of a vehicle body.

As is shown in FIG. 1, in a vehicle such as a passenger vehicle, right and left side members 1 are disposed in a longitudinal direction of a vehicle body on right-hand and left-hand sides of a front lower part of the vehicle body. The side member 1 is configured to include a rear portion 2, a front portion 3 which is positioned higher than the rear portion 2 and an intermediate portion 4 which extends between the front and rear portions 2, 3.

Figure 2:
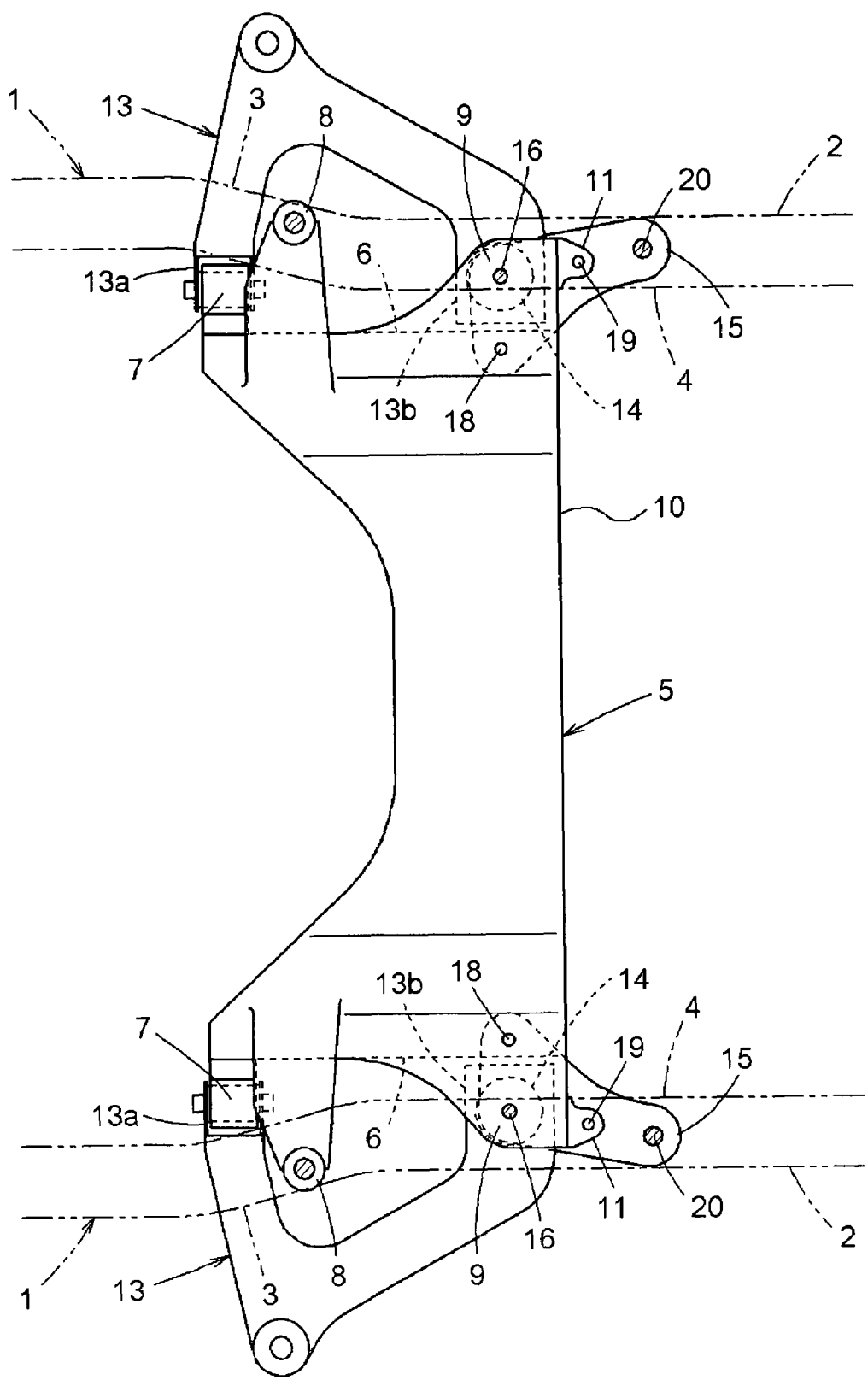
FIG. 2 is a plan view of a subframe and suspension arms, and the vicinities of sheet steel members.
Figure 3:
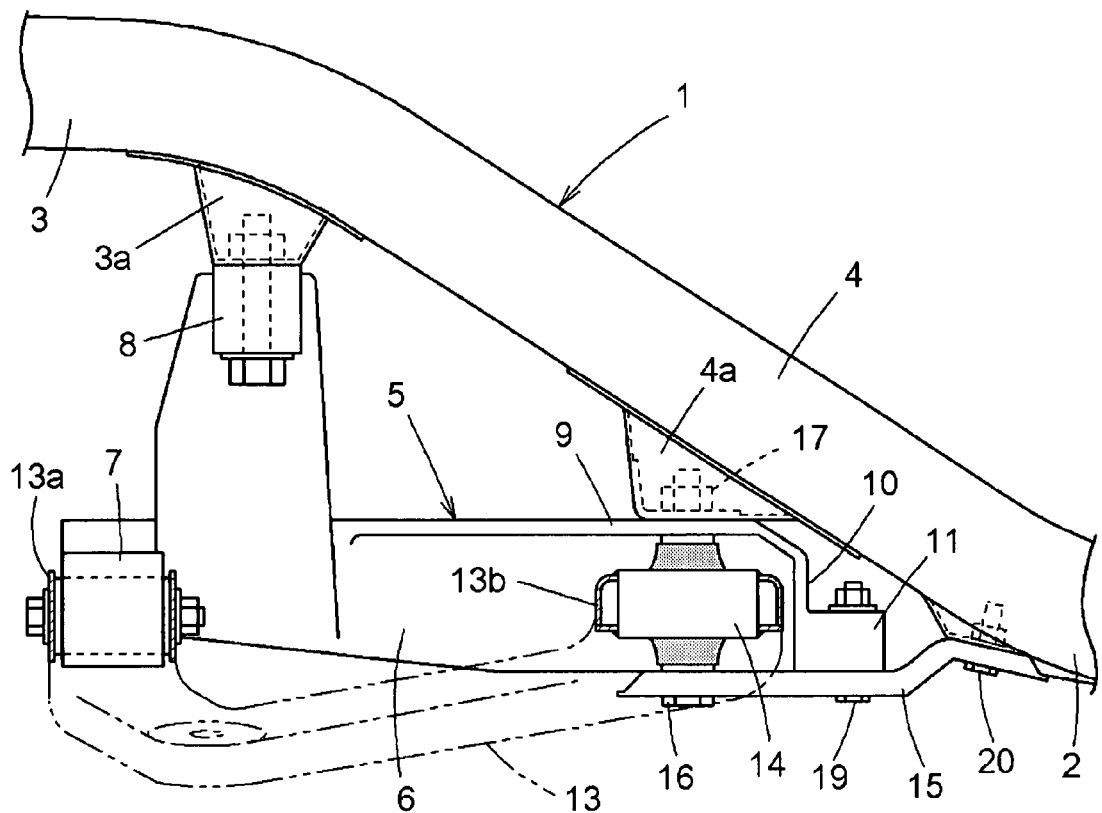
FIG. 3 is a side view of the subframe and the suspension arm, and the vicinity of the sheet steel member.

As is shown in FIGS. 1, 2, 3, a subframe 5 is formed integrally of diecast aluminum (an example of a light metal), and a boss portion 7 and a strut-shaped connecting portion 8 are formed integrally at front portions of right and left lateral wall portions 6 of the subframe 5. As is shown in FIGS. 1, 2, 3, 6, a receiving portion 9 is formed integrally on upper portions of rear portions of the right and left lateral wall portions of the subframe 5 in such a manner as to extend transversely outwards therefrom, a rear wall portion 10 is formed integrally on the rear portions of the right and left lateral wall portions 6 and rear portions of the receiving portions 9 of the subframe 5 in such a manner as to extend transversely outwards, and a connecting portion is formed integrally on rear portions of the rear wall portions 10.

In this case, the subframe 5 is formed integrally of diecast aluminum without using a slide mold, and no machining is applied to the lateral wall portions 6, the boss portions 7, the connecting portions 8, the receiving portions 9, the rear wall portions 9, the connecting portions 11 and the like of the subframe.

As is shown in FIGS. 1 and 2, bifurcated suspension arms 13 which support front wheels 12 are provided, and a front base portion 13a of the suspension arm 13 is supported on the boss portion 7 of the subframe 5 via a horizontally oriented rubber bushing joint (not shown) in such a manner as to oscillate vertically. Connecting portions 3a are provided at the front portions 3 of the right and left side members 1, and the connecting portions 8 of the right and left side members 1 are connected to the connecting portions 3a of the front portions 3 of the right and left side members 1 by bolts.

Figure 4:
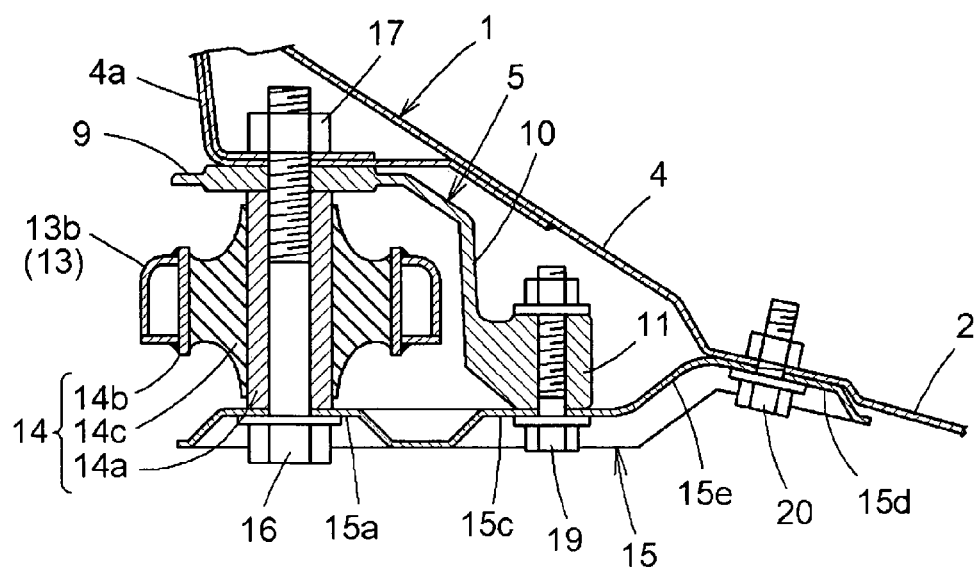
FIG. 4 is a vertical sectional side view of a receiving portion of the subframe, a rear base portion of the suspension arm, a rubber bushing joint, and the vicinity of the sheet steel member.
Figure 5:
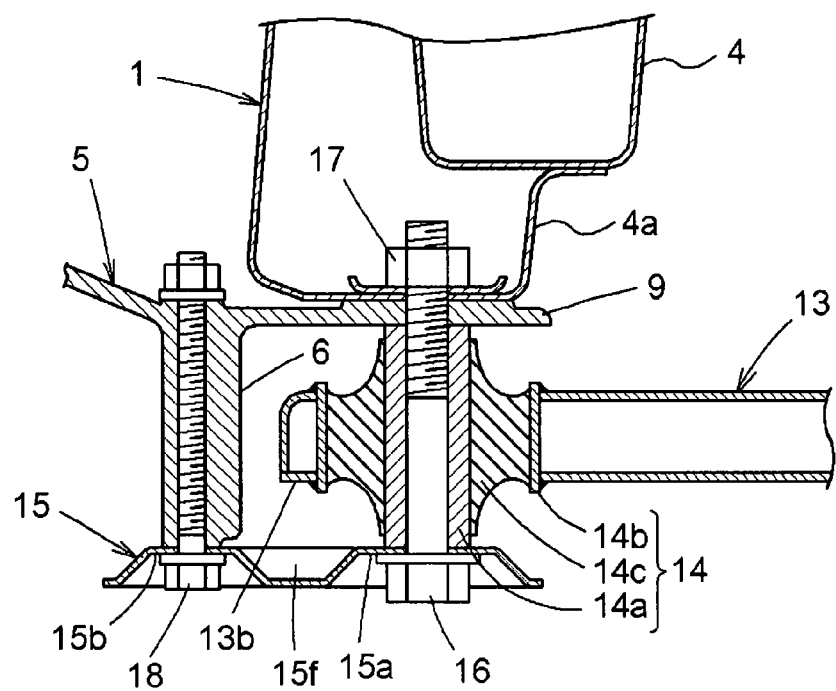
FIG. 5 is a vertical sectional front view of the receiving portion of the subframe, the rear base portion of the suspension arm, the rubber bushing joint, and the vicinity of the sheet steel member.

As is shown in FIGS. 3, 4, 5, a rear base portion 13b of the suspension arm 13 is formed into a ring shape, and a rubber bushing joint 14 is mounted vertically in an interior of the rear base portion 13b of the suspension arm 13. The rubber bushing joint 14 is made up of an inner metallic cylindrical member 14a, an outer metallic ring member 14b and a rubber bushing 14c which is connected to extend between the cylindrical member 14a and the ring member 14b, and the ring member 14b of the rubber bushing joint 14 is mounted on the rear base portion 13b of the suspension arm 13.

As is shown in FIGS. 3, 4, 5, the rear base portion 13b of the suspension arm 13 (the cylindrical member 14a of the rubber bushing joint 14) is brought into abutment with the receiving portion 9 of the subframe 5 from therebelow, and a connecting portion 15a of a sheet steel member 15, which will be described later on, is brought into abutment with the rear base portion 13b of the suspension arm 13 (the cylindrical member 14a of the rubber bushing joint 14) from therebelow. A connecting bolt 16 is inserted (passed vertically) from below into (through) a connecting opening in the connecting portion 15a of the sheet steel member 15, the rear base portion 13b of the suspension arm 13 (the cylindrical member 14a of the rubber bushing joint 14) and a connecting opening in the receiving portion 9 of the subframe 5. Nuts 17 are fixed to connecting portions 4a of the intermediate portions 4 of the right and left side members 1, and the connecting bolts 16 are connected to the connecting portions 14a (the nuts 17) of the intermediate portions 4 of the right and left side members 1. By this configuration, the suspension arms (the front and rear base portions 13a, 13b) are supported on the subframe 5 (the boss portions 7 and the receiving portions) via the rubber bushing joints 14 in such a manner as to oscillate vertically.

As this occurs, as is shown in FIGS. 4 and 5, even though a space between the receiving portion 9 of the subframe 5 and the connecting portion 15a of the sheet steel member 15 does not match a vertical length of the cylindrical member 14a of the rubber bushing joint 14 with good accuracy (for example, even though the space between the receiving portion 9 of the subframe 5 and the connecting portion 15a of the sheet steel member 15 is slightly larger than the vertical length of the cylindrical member 14a of the rubber bushing joint 14), a difference between the space between the receiving portion 9 of the subframe 5 and the connecting portion 15a of the sheet steel member 15 and the vertical length of the cylindrical member 14a of the rubber bushing joint 14 is absorbed by the sheet steel member 15 by virtue of upward elastic deflection of the connecting portion 15a of the sheet steel member 15 by the connecting bolt 16 being tightened (the connecting portion 15a of the sheet steel member 15 is aligned with a lower end of the cylindrical member 14a of the rubber bushing joint 14).

No force is produced which attempts to bend the receiving portion 9 of the subframe 5 downwards by virtue of the upward deflection of the connecting portion 15a of the sheet steel member 15 which is brought about when the connecting bolt 16 is tightened, and no crack is produced in any case in the vicinity of the receiving portion 9 of the subframe 5.

Figure 6:
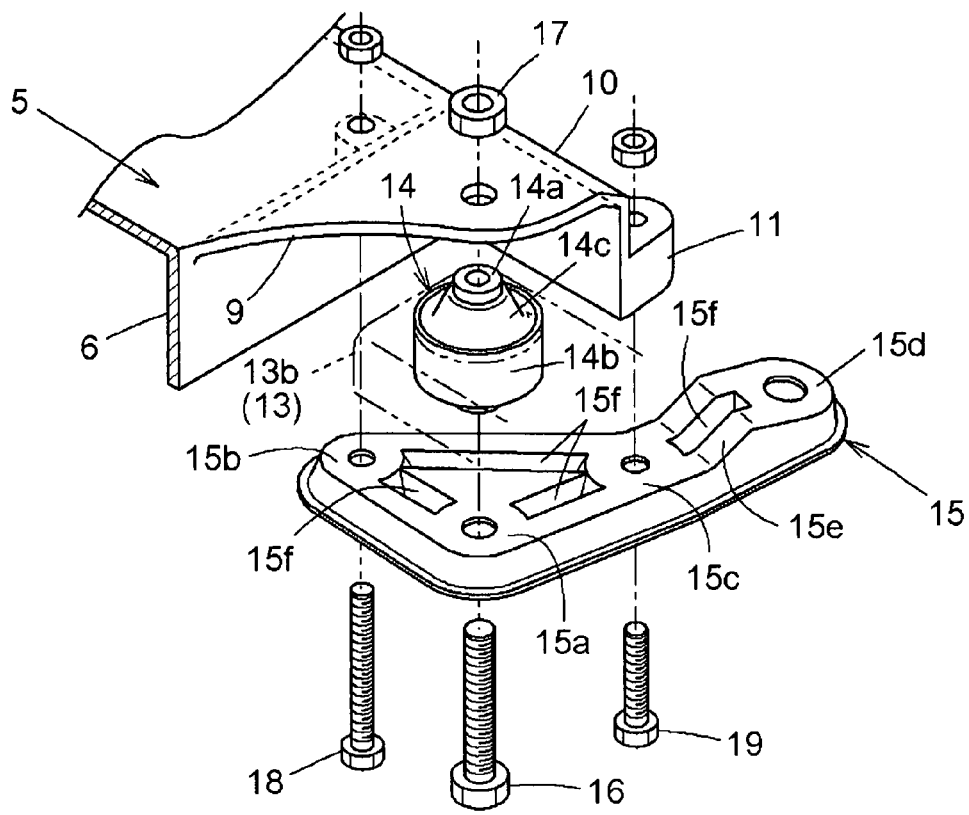
FIG. 6 is an exploded perspective view of the receiving portion of the subframe, the rear base portion of the suspension arm, the rubber bushing joint, and the vicinity of the sheet steel member.

As is shown in FIGS. 4, 5, 6, the sheet steel member is formed integrally by pressing sheet steel, and three connecting portions 15a, 15b, 15c are disposed in a triangular shape so as to lie on the same plane, a bent portion 15e being caused to extend from the connecting portion 15c, so that the connecting portion 15d is connected to the bent portion 15e. Recessed portions 15f for obtaining a reinforcement rib effect is formed in such a manner as to extend between the connecting portions 15a, 15b, 15c, respectively, and a recessed portion 15f is also formed in the bent portion 15c.

As is shown in FIGS. 2, 4, 5, 6, the connecting portions 15a of the sheet steel members 15 are connected to the receiving portions 9 of the subframe 5 and the connecting portions 4a (the nuts 17) of the intermediate portions 4 of the right and left side members 1 by the connecting bolts 16, the connecting portions 15b of the sheet steel members 15 are connected to the subframe 5 by bolts 18, and the connecting portions 15c of the sheet steel members 15 are connected to the connecting portions 11 of the subframe 5 by bolts 19. As this occurs, as viewed from the top (refer to FIGS. 2 and 6), the connecting portions 15a, 15b, 15c (the connecting bolt 16 and the bolts 18, 19) are disposed in a triangular shape. As is shown in FIGS. 2, 3, 4, 6, the bent portion 15e of the sheet steel member 15 is caused to extend rearwards from the connecting portion 11 of the subframe 5, and connecting portions 15d of the sheet steel members 15 are connected to the rear portions 2 of the right and left side members 1 by bolts 20.

By the construction that has been described above, the connecting portions 8 of the subframe 5 are connected to the front connecting portions 3a of the front portions 3 of the right and left side members 1 by bolts, and the receiving portions 9 of the subframe 5 are connected to the connecting portions 4a (the nuts 17) of the intermediate portions 4 of the right and left side members 1. The connecting portions 15a, 15b, 15c of the sheet steel members 15 are connected to the subframe 5 and the receiving portions 9 and the connecting portions 11 of the subframe 5 by the connecting bolts 16 and the bolts 18, 19, respectively, and the connecting portions 15d of the sheet steel members 15 are connected to the rear portions 2 of the right and left side members 1.

By this configuration, as is shown in FIGS. 3, 4, 5, 6, the sheet steel member 15 can be dislocated downwards for removal by removing the connecting bolt 16 and the bolts 18, 19, 20, and the suspension arm 13 can be dislocated downwards for removal by removing the front base portion 13a of the suspension arm 13 without being disrupted by the wheel well and other members. In this case, the subframe 5 does not have to be removed from the right and left side members 1.

In a state as shown in FIGS. 1 and 3, when the vehicle body is brought into a frontal collision, firstly, the right and left side members 1 are broken, whereby impact energy is absorbed. When the impact energy is absorbed in the right and left side members 1 sufficiently, the connecting portions 8 and the receiving portions 9 of the subframe 5 are then broken, thereby allowing the impact energy to act on the sheet steel members 15, whereby the impact energy is further absorbed by virtue of the failure of the sheet steel members 15 (by virtue of bending of the bent portions 15e of the sheet steel members 15).

ANOTHER EMBODIMENT FOR CARRYING OUT THE INVENTION

In the "Best Mode for Carrying out the Invention" that has been described before, the nuts 17 are not fixed to the connecting portions 4a of the intermediate portions 4 of the right and left side members 4, and the connecting bolts 16 may be fixed downwards to the connecting portions 4a of the intermediate portions 4 of the right and left side members 1 so that the connecting bolts 16 are made to be used as stud bolts.

With this configuration, the suspension arm (the front and rear base portions 13a, 13b) is supported on the subframe 5 (the boss portion 7 and the receiving portion 9) via the rubber bushing 14 in such a manner as to oscillate vertically by fastening a nut onto a lower end of the connecting bolt 16. By removing the nut from the lower end of the connecting bolt 16, the sheet steel member 15 can be dislocated downwards for removal, and by removing the front base portion of the suspension arm 13 from the boss portion 7 of the subframe 5, the suspension arm 13 can be dislocated downwards for removal without being disrupted by the wheel well and other members.

Similarly, the bolts 18, 19, 20 are fixed downwards to the subframe 5, the connecting portions 11 of the subframe 5 and the rear portions 2 of the right and left side members 1, the bolts 18, 19, 20 may be made to be used as stud bolts. With this configuration, the sheet steel members 15 are connected to the connecting portions 11 of the subframe 5 and the rear portions 2 of the right and left side members 1 by nuts.

The invention can also be applied to right and left side members and a subframe at a rear lower part of the vehicle body. In addition, the subframe may be formed by welding an extruded material of aluminum instead of diecast aluminum, and in place of diecast aluminum and extruded aluminum material, the subframe may be formed of light metal which is light in weight and relatively brittle including aluminum alloy, magnesium and magnesium alloy, Duralumin and the like.

INDUSTRIAL APPLICABILITY

According to the vehicle suspension arm supporting structure of the invention, the suspension arms can be supported on the subframe without any difficulty and with good accuracy while realizing a reduction in weight by forming the subframe of a light metal.

The invention claimed is:

1. A vehicle suspension arm supporting structure, wherein right and left side members which are disposed longitudinally at a lower part of a vehicle body and a subframe which is made of a light metal and is connected to the right and left side members in such a manner as to extend therebetween are provided, and suspension arms which support wheels are made to be supported on the subframe, wherein at one supporting portion of a plurality of supporting portions of the subframe which supports one of the suspension arms, a receiving portion is integrally formed on the subframe in such a manner as to extend transversely outwards, and a sheet steel member, which is a member that is different from the subframe, is connected to the subframe in such a manner as to be situated below the receiving portion of the subframe at a predetermined interval, the sheet steel member including three connecting portions disposed in the same plane in a triangular shape and three recessed reinforcement portions extending between the respective connecting portions, each connecting portion receiving a fastener to connect the sheet steel member to the subframe, and wherein a base portion of the suspension arm is disposed between the receiving portion of the subframe and the sheet steel member, the base portion of the suspension arm is made to be supported on the subframe via a rubber bushing joint by a connecting bolt which passes vertically through the receiving portion of the subframe and one of the connecting portions of the sheet steel member, and the receiving portion of the subframe is connected to one of the right and left side members by the connecting bolt.

2. A vehicle suspension arm supporting structure as set forth in claim 1, wherein the sheet steel member is set at a portion closest to the ground of the plurality of supporting portions of the subframe which support the suspension arm.

3. A vehicle suspension arm supporting structure as set forth in claim 1, wherein the sheet steel member is caused to extend from the subframe, and an extending portion of the sheet steel member is connected to a stationary portion of a vehicle.

4. A vehicle suspension arm supporting structure as set forth in claim 3, wherein the right and left side members and the subframe are disposed at a front lower part of the vehicle body, wherein the one supporting portion of the plurality of supporting portions of the subframe which support the suspension arm is situated at a rear portion of the subframe, and wherein the sheet steel member is caused to extend rearwards from the subframe, and extending portion of the sheet steel member is connected to one of the right and left side members.

5. A vehicle suspension arm supporting structure as set forth in claim 1, wherein the suspension arm is bifurcated.

* * * * *